(12) United States Patent
Bahnasy et al.

(10) Patent No.: US 11,929,912 B2
(45) Date of Patent: Mar. 12, 2024

(54) METHOD AND SYSTEM FOR GENERATING NETWORK CONFIGURATIONS USING GRAPH NEURAL NETWORK

(71) Applicant: Huawei Technologies Co., Ltd., Shenzhen (CN)

(72) Inventors: Mahmoud Mohamed Bahnasy, Shenzhen (CN); Fenglin Li, Shenzhen (CN); Shihan Xiao, Shenzhen (CN); Xiangle Cheng, Shenzhen (CN); Majid Ghaderi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/074,319

(22) Filed: Dec. 2, 2022

(65) Prior Publication Data

US 2023/0124663 A1 Apr. 20, 2023

Related U.S. Application Data

(63) Continuation of application No. PCT/CN2020/094058, filed on Jun. 3, 2020.

(51) Int. Cl.
*H04L 45/02* (2022.01)
*H04L 45/00* (2022.01)

(52) U.S. Cl.
CPC ............ *H04L 45/08* (2013.01); *H04L 45/14* (2013.01)

(58) Field of Classification Search
CPC ....... H04L 45/02; H04L 45/033; H04L 45/08; H04L 45/14
See application file for complete search history.

(56) References Cited

U.S. PATENT DOCUMENTS

| 2019/0020555 | A1 | 1/2019 | Tayal et al. |
| 2020/0204490 | A1* | 6/2020 | Choudhury ............ H04L 43/20 |
| 2021/0248443 | A1* | 8/2021 | Shu .................... G06F 16/9024 |

FOREIGN PATENT DOCUMENTS

| CN | 108809839 A | 11/2018 |
| CN | 110311863 A | 10/2019 |
| CN | 110417664 A | 11/2019 |
| WO | 2019081781 A1 | 5/2019 |

OTHER PUBLICATIONS

BBC. United Airlines jets grounded by computer router glitch. https://www.bbc.com/news/technology-33449693 2015.
(Continued)

*Primary Examiner* — Mansour Oveissi
*Assistant Examiner* — David M Oveissi

(57) ABSTRACT

A method, processing system and processor-readable medium for generating network configurations using a graph neural network (GNN) are provided. The method may include receiving a first matrix M generated based on a set of network requirements; storing a GNN having a plurality of nodes v and a plurality of edges; initializing the GNN based on a second matrix $X_v$ having a plurality of elements, each element corresponding to a node from a plurality of nodes v of the GNN; and generating an output matrix having a plurality of nodes labelled based on the first matrix M.

18 Claims, 13 Drawing Sheets

(56) References Cited

OTHER PUBLICATIONS

Ryan Beckett, Aarti Gupta, Ratul Mahajan, and David Walker. A General Approach to Network Configuration Verification. In Proceedings of the Conference of the ACM Special Interest Group on Data Communication (Los Angeles, CA, USA) (SIGCOMM '17). Association for Computing Machinery, New York, NY, USA, 155-168. https://doi.org/10.1145/3098822.3098834 2017.

Ryan Beckett, Ratul Mahajan, Todd Millstein, Jitendra Padhye, and David Walker. Don't Mind the Gap: Bridging Network-Wide Objectives and Device-Level Configurations. In Proceedings of the 2016 ACM SIGCOMM Conference (Florianopolis, Brazil) (SIGCOMM '16). Association for Computing Machinery, New York, NY, USA, 328-341. https://doi.org/10.1145/2934872.2934909 2016.

Ryan Beckett, Ratul Mahajan, Todd Millstein, Jitendra Padhye, and David Walker. Network Configuration Synthesis with Abstract Topologies. In Proceedings of the 38th ACM SIGPLAN Conference on Programming Language Design and Implementation (Barcelona, Spain) (PLDI 2017). Association for Computing Machinery, New York, NY, USA, 437-451. https://doi.org/10.1145/3062341.3062367 2017.

Leonardo De Moura and Nikolaj Bjørner. Z3: An Efficient SMT Solver. In Proceedings of the Theory and Practice of Software, 14th International Conference on Tools and Algorithms for the Construction and Analysis of Systems (Budapest, Hungary) (TACAS'08/ETAPS'08). Springer-Verlag, Berlin, Heidelberg, 337-340. 2008.

Ahmed El-Hassany, Petar Tsankov, Laurent Vanbever, and Martin Vechev. NetComplete: Practical network-wide configuration synthesis with autocomple-tion. In 15th ☐USENIX☐ Symposium on Networked Systems Design and Implementation (☐NSDI☐ 18). 579-594. 2018.

Seyed K. Fayaz, Tushar Sharma, Ari Fogel, Ratul Mahajan, Todd Millstein, Vyas Sekar, and George Varghese. Efficient Network Reachability Analysis Using a Succinct Control Plane Representation. In 12th USENIX Symposium on Operating Systems Design and Implementation (OSDI 16). USENIX Association, Savannah, GA, 217-232. https://www.usenix.org/conference/osdi16/technical-sessions/presentation/fayaz 2016.

Nick Feamster and Hari Balakrishnan. Detecting BGP Configuration Faults with Static Analysis. In Proceedings of the 2nd Conference on Symposium on Networked Systems Design & Implementation—vol. 2 (NSDI'05). USENIX Association, USA, 43-56. 2005.

Ari Fogel, Stanley Fung, Luis Pedrosa, Meg Walraed-Sullivan, Ramesh Govin-dan, Ratul Mahajan, and Todd Millstein. A General Approach to Network Configuration Analysis. In Proceedings of the 12th USENIX Conference on Net¬worked Systems Design and Implementation (Oakland, CA) (NSDI'15). USENIX Association, USA, 469-483. 2015.

Aaron Gember-Jacobson, Raajay Viswanathan, Aditya Akella, and Ratul Maha-jan. Fast Control Plane Analysis Using an Abstract Representation. In Proceedings of the 2016 ACM SIGCOMM Conference (Florianopolis, Brazil) (SIG-COMM '16). Association for Computing Machinery, New York, NY, USA, 300-313. https://doi.rg/10.1145/2934872.2934876 2016.

Fabien Geyer and Stefan Schmid. DeepMPLS: Fast Analysis of MPLS Configurations Using Deep Learning. In 2019 IFIP Networking Conference (IFIP Networking). IEEE, 1-9. 2019.

M. Gori, G. Monfardini, and F. Scarselli. A new model for learning in graph domains. In Proceedings. 2005 IEEE International Joint Conference on Neural Networks, 2005., vol. 2. 729-734 vol. 2. https://doi.org/10.1109/IJCNN.2005.1555942 2005.

The Guardian. Stock trading closed on NYSE after glitch caused major out¬age. https://www.theguardian.com/business/live/2015/jul/08/new-york-stock-exchange-wall-street 2015.

Alexander J. T. Gurney, Limin Jia, Anduo Wang, and Boon Thau Loo. Partial Specification of Routing Configurations. 2011.

Tuomas Haarnoja, Aurick Zhou, Pieter Abbeel, and Sergey Levine. Soft actor-critic: Off-policy maximum entropy deep reinforcement learning with a stochastic actor. arXiv preprint arXiv:1801.01290 (2018). 2018.

Aric A. Hagberg, Daniel A. Schult, and Pieter J. Swart. Exploring Network Structure, Dynamics, and Function using NetworkX. In Proceedings of the 7th Python in Science Conference, Gaël Varoquaux, Travis Vaught, and Jarrod Millman (Eds.). Pasadena, CA USA, 11-15. 2008.

William L. Hamilton, Rex Ying, and Jure Leskovec. Inductive Representation Learning on Large Graphs. In Proceedings of the 31st International Conference on Neural Information Processing Systems (Long Beach, California, USA) (NIPS'17). Curran Associates Inc., Red Hook, NY, USA, 1025-1035. 2017.

Jesper Stenbjerg Jensen, Troels Beck Krøgh, Jonas Sand Madsen, Stefan Schmid, Jiří Srba, and Marc Tom Thorgersen. P-Rex: Fast Verification of MPLS Networks with Multiple Link Failures. In Proceedings of the 14th International Conference on Emerging Networking Experiments and Technologies (Heraklion, Greece) (CoNEXT '18). Association for Computing Machinery, New York, NY, USA, 217-227. https://doi.org/10.1145/3281411.3281432 2018.

Zeus Kerravala. What is behind network downtime? proactive steps to reduce human error and improve availability of networks. Technical Report 2004.

D. R. Kuhn. Sources of failure in the public switched telephone network. Computer 30, (Apr. 4, 1997), 31-36. https://doi.org/10.1109/2.585151 1997.

Petr Lapukhov. Building scalable data centers: Bgp is the better igp. In NANOG, vol. 55. 2010.

Petr Lapukhov, Ariff Premji, and Jon Mitchell. Use of BGP for routing in large-scale data centers. Internet Requests for Comments RFC Editor RFC 7938 (2016). https://tools.ietf.org/html/rfc7938 2016.

Kyowoon Lee, Sol-A Kim, Jaesik Choi, and Seong-Whan Lee. Deep Reinforcement Learning in Continuous Action Spaces: a Case Study in the Game of Simulated Curling. In Proceedings of the 35th International Conference on Machine Learning (Proceedings of Machine Learning Research), Jennifer Dy and Andreas Krause (Eds.), vol. 80. PMLR, Stockholmsmässan, Stockholm Sweden, 2937-2946. http://proceedings.mlr.press/v80/lee18b.html 2018.

Winfried Lötzsch. Using Deep Reinforcement Learning for the Continuous Control of Robotic Arms. arXiv preprint arXiv:1810.06746 (2018). 2018.

Mashable. Facebook, Tinder, Instagram suffer widespread issues. https://mashable.com/2015/01/27/facebook-tinder-instagram-issues/ 2015.

Sanjai Narain et al. Network Configuration Management via Model Finding . . . In LISA, vol. 5. 15-15. 2005.

Sanjai Narain, Gary Levin, Sharad Malik, and Vikram Kaul. Declarative Infrastructure Configuration Synthesis and Debugging. J. Netw. Syst. Manage. 16, (Sep. 3, 2008), 235-258. https://doi.org/10.1007/s10922-008-9108-y 2008.

Chaithan Prakash, Jeongkeun Lee, Yoshio Turner, Joon-Myung Kang, Aditya Akella, Sujata Banerjee, Charles Clark, Yadi Ma, Puneet Sharma, and Ying Zhang. PGA: Using Graphs to Express and Automatically Reconcile Network Policies. SIGCOMM Comput. Commun. Rev. 45, (Aug. 4, 2015), 29-42. https://doi.org/10.1145/2829988.2787506 2015.

Tim Salimans, Jonathan Ho, Xi Chen, Szymon Sidor, and Ilya Sutskever. Evolution strategies as a scalable alternative to reinforcement learning. arXiv preprint arXiv:1703.03864 (2017). https://arxiv.org/abs/1703.03864 2017.

F. Scarselli, M. Gori, A. C. Tsoi, M. Hagenbuchner, and G. Monfardini. The Graph Neural Network Model. IEEE Transactions on Neural Networks 20, (Jan. 1, 2009), 61-80. https://doi.org/10.1109/TNN.2008.2005605 2009.

Internet Society. Google leaked prefixes—and knocked Japan off the Internet. https://www.internetsociety.org/blog/2017/08/google-leaked-prefixes-knocked-japan-off-internet 2017.

Freek Stulp and Olivier Sigaud. Robot skill learning: From reinforcement learning to evolution strategies. Paladyn, Journal of Behavioral Robotics 4, 1 (2013), 49-61. 2013.

(56) References Cited

OTHER PUBLICATIONS

Kausik Subramanian, Loris D'Antoni, and Aditya Akella. Genesis: Synthesizing Forwarding Tables in Multi-Tenant Networks. In Proceedings of the 44th ACM SIGPLAN Symposium on Principles of Programming Languages (Paris, France) (POPL 2017). Association for Computing Machinery, New York, NY, USA, 572-585. https://doi.org/10.1145/3009837.3009845 2017.

Konstantin Weitz, Doug Woos, Arvind Krishnamurthy, Michael D Ernst, and Zachary Tatlock. Formal Semantics and Verification for the Border Gateway Protocol. Technical Report. Tech. rep. 2016.

Konstantin Weitz, Doug Woos, Emina Torlak, Michael D. Ernst, Arvind Krish-namurthy, and Zachary Tatlock. Scalable Verification of Border Gateway Protocol Configurations with an SMT Solver. In Proceedings of the 2016 ACM SIGPLAN International Conference on Object-Oriented Programming, Systems, Languages, and Applications (Amsterdam, Netherlands) (OOPSLA 2016). Association for Computing Machinery, New York, NY, USA, 765-780. https://doi.org/10.1145/2983990.2984012 2016.

Daan Wierstra, Tom Schaul, Tobias Glasmachers, Yi Sun, Jan Peters, and Jürgen Schmidhuber. Natural Evolution Strategies. J. Mach. Learn. Res. 15, (Jan. 1, 2014), 949-980 2014.

Ronald J. Williams. Simple Statistical Gradient-Following Algorithms for Connectionist Reinforcement Learning. Mach. Learn. 8, (May 3-4, 1992), 229-256. https://doi.org/10.1007/BF00992696 1992.

* cited by examiner

700 ⤴

```
network:
  BGPconfig: # main AS parameters
    asn: 500
    instance_id: 500
  ASes_prefixes:
    500: [192.168.16.0/30, 192.168.16.4/30, 192.168.16.8/30]
  ...
  routers:
  A: # ID
    name: RouterA
    asn: 500
    interfaces:
    - ifName: Ethernet 0/0/0
      ip: 192.168.16.1/30
  ...
  adjacency: # bidirectional links
  - src: 100
    srcIf: Ethernet 0/0/0
    dst: A
    dstIf: GigabitEthernet 0/0/0
  ...
  intent:
    reachability:
      - [100, 200]
    exitPointPreference:
    - src: 200
      exitPoints: [B, C]
      dst: 500
  ...
```

| ES Algorithm |
|---|
| Result: An edge state matrix |
| 1    Initialize neural network weights $\theta_0 = 1$; |
| 2    Initialize noise standard deviation $\sigma$; |
| 3    Initialize learning rate $lr$; |
| 4    for $t \leftarrow 0, 1, 2, ..$ do |
| 5      for $i \leftarrow 0, 1, 2, ..p$ do |
| 6        Sample $\epsilon_i \sim \mathcal{N}(0, 1)$; |
| 7        neural network weights $\leftarrow \theta_t + \sigma\epsilon_i$; |
| 8        Perform feedforward; |
| 9        $rewards_i \leftarrow validator(feedforward.output)$; |
| 10        if $reward_i == 1$ then |
| 11          return ;      // Solution found |
| 12        end |
| 13      end |
| 14      $\theta_{t+1} \leftarrow \theta_t + lr \frac{1}{p \cdot \sigma} \sum_{j=1}^{p} (\epsilon_i \cdot rewards_i)$; |
| 15    end |

FIG. 8

| Source | Neighbor | AS to announce and preference index |
|---|---|---|
| A | AS100 | AS500, AS200, AS300 & AS400 |
| | B | AS100, AS200, AS300 & AS400 |
| | C | AS100, AS200, AS300 & AS400 |
| | D | AS100, AS200, AS300 & AS400 |
| B | AS200 | AS500 & AS100 (preference: 1) |
| | A | AS100, AS200, AS300, AS400 |
| | C | AS100, AS200, AS300, AS400 |
| | D | AS100, AS200, AS300, AS400 |
| C | AS200 | AS500 & AS100 (preference: 2) |
| | AS300 | AS500 & AS100 |
| | AS400 | AS500 & AS100 |
| | A | AS100, AS200, AS300 & AS400 |
| | B | AS100, AS200, AS300 & AS400 |
| | D | AS100, AS200, AS300 & AS400 |
| D | A | AS100, AS200, AS300 & AS400 |
| | B | AS100, AS200, AS300 & AS400 |
| | C | AS100, AS200, AS300 & AS400 |
| AS100 | A | AS100 |
| AS200 | B | AS200 |
| | C | AS200 |
| AS300 | C | AS300 |
| AS400 | C | AS400 |

FIG. 10

METHOD AND SYSTEM FOR GENERATING NETWORK CONFIGURATIONS USING GRAPH NEURAL NETWORK

RELATED APPLICATIONS

The present disclosure is a continuation of and claims benefit of International Application Number PCT/CN2020/094058, filed Jun. 3, 2020, "METHOD AND SYSTEM FOR GENERATING NETWORK CONFIGURATIONS USING GRAPH NEURAL NETWORK", the contents of which are incorporated herein by reference.

TECHNICAL FIELD

The present disclosure relates to network configurations, and in particular to a method, system, and processor readable medium for generating network configurations using a graph neural network (GNN).

BACKGROUND

Billions of users and devices are connected through campus, enterprise, and Internet Service Providers (ISPs) networks to the internet. These networks, known as Autonomous Systems (AS), use Border Gateway Protocol (BGP) to exchange reachability information that data traffic can take across the Internet. Moreover, the rapid growth and development in data center architecture emerges a new direction to use BGP as Interior Gateway Protocols (IGPs) within data centers.

BGP is a standard exterior gateway protocol that is responsible for exchanging reachability information among Autonomous Systems. BGP is a path-vector routing protocol which announces routing information as a destination Internet Protocol (IP) prefix P and a list of Autonomous Systems through which P can be reached. Routers can define a filter on the incoming or outgoing BGP announcement to drop, accept or modify them. BGP announces reachability information among border routers using External Border Gateway Protocol (EBGP) sessions. Routing exchange among routers in the same AS is carried out using Internal Border Gateway Protocol (IBGP) sessions. IBGP learned routes are not re-announced internally to prevent forwarding loops inside Autonomous Systems. Also, BGP routers drop EBGP routing announcements that have the local AS number in the AS list to prevent forwarding loops. If multiple announcements are available for the same prefix, routers may prefer routes with lowest local preference. For routes with the same local preference, BGP uses other factors such as path length, Multi Exit Discriminator (MED) and IGP metric. Such flexibility introduced by BGP, in controlling how traffic flows through Autonomous Systems, increases network configuration complexity.

Network configuration could be defined as the process of acquiring, organizing, and maintaining information about all the components of a computer network. Such a process is often done manually to produce low-level configuration for each network device. With the huge increase in the number of network devices, network configuration becomes very challenging and error-prone. In addition, manual configuration is not fully evaluated under various fault conditions, which causes major business losses when unexpected misconfiguration gets exposed (e.g., misconfigured backup path). BGP-related misconfiguration incidents may cause network downtime for various corporations. Moreover, studies depict that human-induced misconfiguration is the main culprit behind the majority of network downtime.

There is therefore a need for an improved system and method to generate reliable network configurations while making efficient use of computing resources.

SUMMARY

The present disclosure provides a method, processing system and processor readable medium for generating network configuration using a graph neural network (GNN). In some embodiments, the method, processing system, and processor-readable medium use a readout neural network (Readout NN) to further refine an edge state matrix that is determined using the output of the GNN. The edge state matrix may be used to calculate a reward based on a given set of network requirements. When the reward is less than a predefined threshold, an optimizer may be used to update one or more weights in the GNN or Readout NN. When the reward is equal to or greater than a predefined threshold, the training of the GNN and Readout NN may stop, and the edge state matrix may be converted to a set of network configurations for deployment.

In one aspect of the disclosure, there is provided a system including a processor and a non-transient memory storing instructions which, when executed by the processor device, cause the processor to: receive a first matrix M representative of a network having a plurality of routers, each element in M may indicate a connectivity state for data traffic between two routers from the plurality of routers based on a set of network requirements; store in the non-transient memory, a GNN comprising a plurality of nodes v and a plurality of edges, where each of the plurality of nodes v, and corresponds to a respective router from the plurality of routers, and each of the plurality of edges corresponds to a physical link connection between two or more of the plurality of routers; and train the GNN to generate an output matrix $O_v$, where $O_v$ includes a plurality of nodes labelled based on the first matrix M.

In another aspect, example embodiments are directed to a method for generating network configurations using a GNN. The method includes receiving a first matrix M representative of a network having a plurality of routers, where each element in M indicates a connectivity state for data traffic between two routers from the plurality of routers based on a set of network requirements; storing a graph neural network (GNN) including a plurality of nodes v and a plurality of edges, where each of the plurality of nodes v, and corresponds to a respective router from the plurality of routers, and each of the plurality of edges corresponds to a physical link connection between two or more of the plurality of routers; and training the GNN to generate an output matrix $O_v$, where $O_v$ includes a plurality of nodes labelled based on the first matrix M.

The disclosed embodiments may remove the burden of manually designing network configurations for network devices and routers. The GNN and Readout NN, once trained, may automatically generate network-wide configurations given a network topology and high-level network requirements.

In some embodiments, training the GNN may include: initializing the GNN based on a second matrix $X_v$, having a plurality of elements; aggregating neighbourhood information of each node from the plurality of nodes v of the GNN; calculating a hidden state of each node from the plurality of nodes v of the GNN based on the respective neighbourhood information; and generating the $O_v$ based on the hidden state of each node from the plurality of nodes v of the GNN.

In some embodiments, the second matrix $X_v$ may be an identity matrix, and each column of $X_v$ may be associated with a router from the plurality of routers.

In some embodiments, each column of $X_v$ is a hot vector that represents a respective router from the plurality of routers.

In some embodiments, $$O_v = \begin{bmatrix} M \\ V \end{bmatrix},$$

V is an edge state matrix having a plurality of element, wherein each element of V indicates a transmission state for data traffic originating from each router of the plurality of routers.

In some embodiments, the method may include training a Readout Neural Network (Readout NN), where the Readout NN receives $O_v$ as input and generates the edge state matrix V.

In some embodiments, the method may include: receiving the edge state matrix V and generating a reward using a configuration validator; and updating one or more weight parameters in the GNN and the Readout NN based on the reward using an optimizer unit.

In some embodiments, the configuration validator is configured to evaluate the edge state matrix V based on the set of network requirements.

In some embodiments, the optimizer unit is configured to update the one or more weight parameters in the GNN and the Readout NN to maximize the reward.

In some embodiments, when the reward from the configuration validator has a value meeting a predefined threshold, the method may stop training the GNN before forwarding the edge state matrix V to a configuration writer.

In some embodiments, the predefined threshold is 1.

In some embodiments, the configuration writer may be configured to convert the edge state matrix V into a valid network configuration.

In some embodiments, the method may include deploying the valid network configuration into one or more of the plurality of routers.

According to a further aspect which can be combined with other embodiments disclosed herein, there is provided a non-transitory processor-readable medium containing instructions executable by a processor to carry out the method steps above.

BRIEF DESCRIPTION OF THE DRAWINGS

Embodiments will now be described by way of examples with reference to the accompanying drawings, in which like reference numerals may be used to indicate similar features.

FIG. 7 is a snippet of an example YAML file used to generate an input matrix to train a GNN;

FIG. 8 is an example of an algorithm used to optimize weight parameters of a GNN in training according to example embodiments described herein;

FIG. 10 shows an example table for BGP sessions generated by a configuration writer according to example embodiments described herein;

DETAILED DESCRIPTION OF EMBODIMENTS

Figure 1:
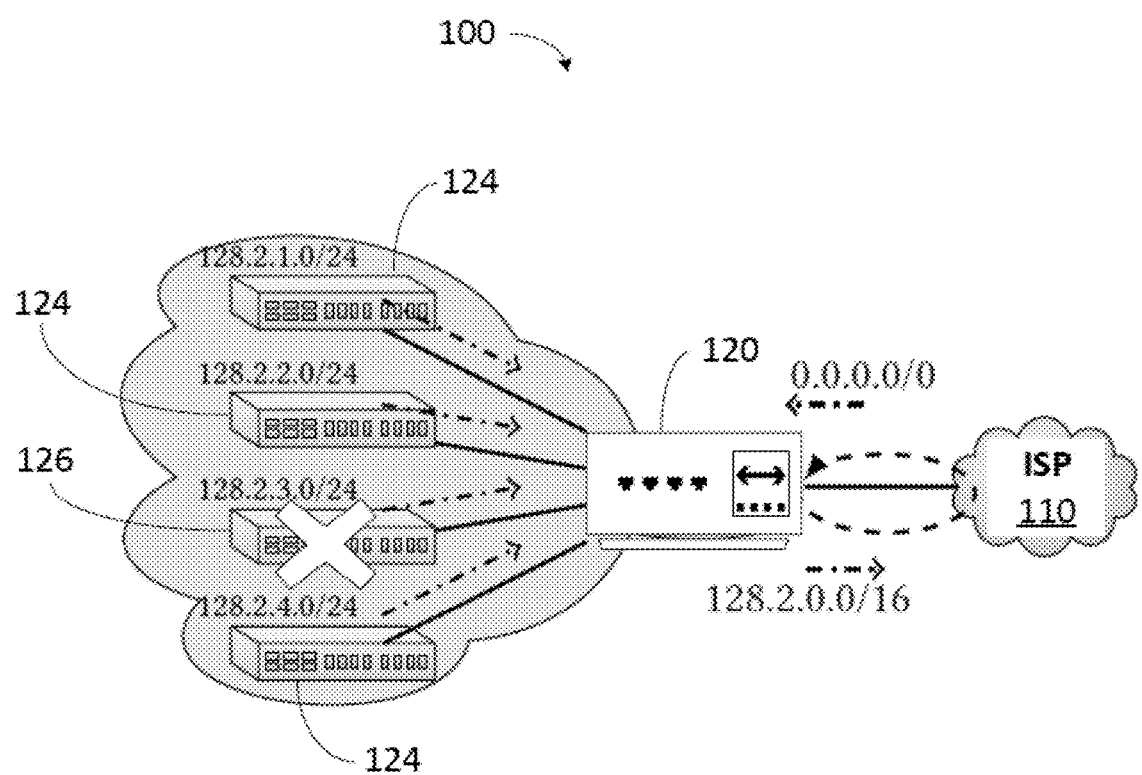
FIG. 1 illustrates an example network topology with a network issue.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

FIG. 1 illustrates an example network topology 100 with a network issue. A data center is allocated IP address space 128.2.0.0/16. Inside the data center, there are four different sub-networks 124, 126 as shown. To reduce routing table space and limit routing table instability, router 120 announces one aggregated route to the Internet Service Provider (ISP) 110. Also, router 120 receives a default route from the ISP 110 for unknown prefixes. This configuration works correctly as long as all sub-networks 124, 126 are active. When prefix 128.2.3.0/24 126 fails, the ISP 110 keeps sending traffic to this prefix through router 120. Since router 120 does not have a direct connection to prefix 128.2.3.0/24 126 anymore, it matches this traffic with the default route and redirects the traffic to the ISP 110. Therefore, this traffic keeps bouncing between the ISP 110 and router 120 creating a forwarding loop between router 120 and the ISP 110. This simple example demonstrates how network configuration is complex and would require manual intervention from time to time. However, with exponential increase in the number of network devices and the complexity of operator intent, network configuration has become very challenging and error-prone.

Several solutions exist to avoid or solve a network issue as described above, for example by verifying exiting configuration, running a predefined verification scenario on existing network configuration, completing existing network templates, or using a pre-defined template and fill out the blanks in such template. Another proposed solution uses Satisfiability Modulo Theory (SMT)-based methods to synthesize network configuration, which do not scale well for large network topologies.

The example embodiments in this disclosure describe training of a neural network to generate a network configuration based on network requirements. The example embodiments may be scalable and adapted for a variety of different network types and protocols. In some embodiments, a scalable neural network-based model is implemented to automate the process to generate network configuration settings (or "network configurations" for short) for a particular network topology. The proposed solution may be implemented for variety of network types and filters, such as BGP, Multiprotocol Label Switching (MPLS), Access Control List (ACL) and IGP (e.g., RIP & OSPF). The neural-network based model, and in particular, the GNN-based model described in some embodiments below, can generate a network configuration based on a set of network requirements for a BGP network.

Example embodiments will now be described with respect to methods, systems, and non-transitory media for generating network configurations based on a set of network requirements. Network requirements may be generated, either manually (e.g. by a network administrator), or by an artificial intelligence device, based on goals or limitations of a network. For example, Cisco® lists several examples (reproduced below) how an intent can be applied to a network infrastructure at https://www.ciscopress.com/articles/article.asp?p=2995353.

| Intent | Execution Steps |
| --- | --- |
| I have a telepresence session at 10:00 a.m. | Create an HD video session to the remote peer, create the required end-to-end Quality of Service parameters for this specific session, reserve the bandwidth, set up audio, validate performance, keep the connection safe and secure during the session, once finished disconnect the HD video session, remove the end-to-end quality of service session, and remove the bandwidth reservation. |
| This application is migrating to the cloud. | Take the existing access policy for that application from the datacenter policy, transform the policy into an application policy for Internet access, deploy the policy on all perimeter firewalls, and change routing for that application to the cloud. |
| Potential malware has been found on a device. | Reallocate the device to an investigate policy that includes in-depth monitoring of traffic and host isolation, execute a Change-of-Authorization to place the device in the new policy, notify security and administrator of a possible incident, and await investigation. |

Figure 2:
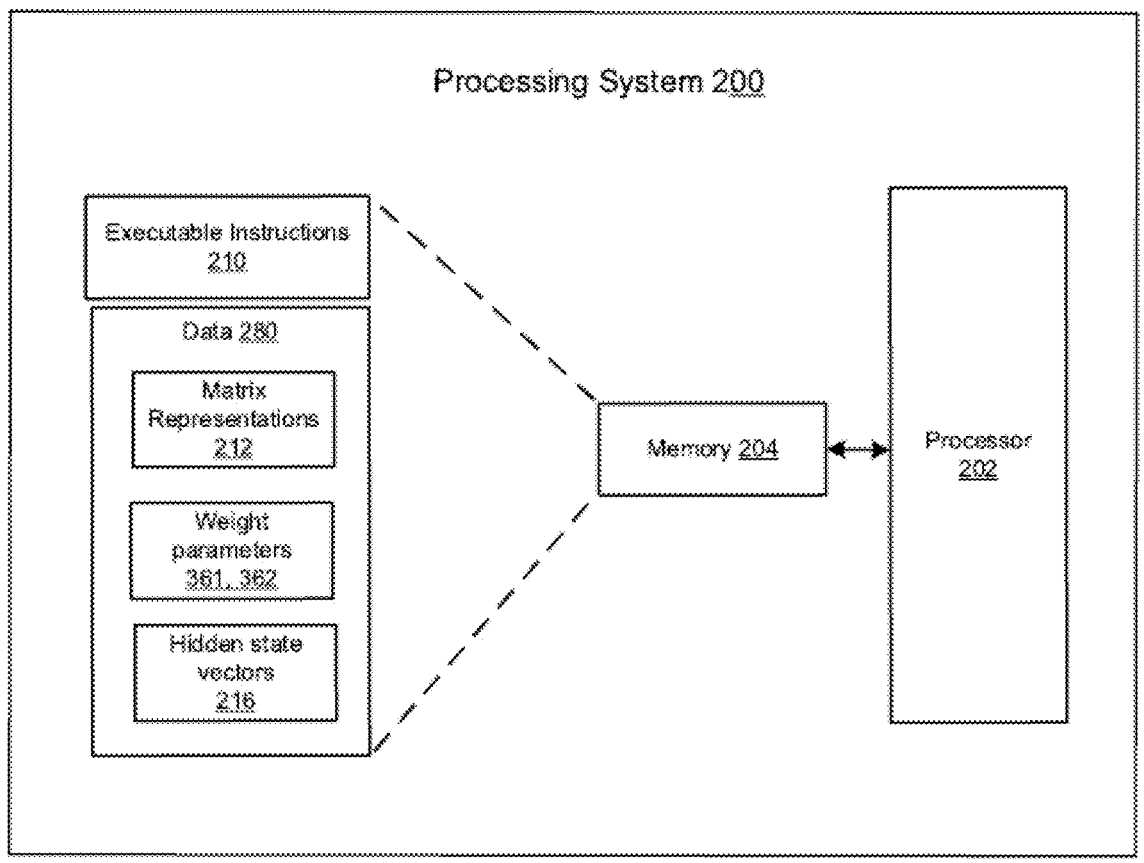
FIG. 2 illustrates a block diagram of an example processing system operable to implement a GNN according to example embodiments described herein.

FIG. 2 illustrates a block diagram of an example processing system 200 operable to implement a GNN. The processing system 200 includes a processor 202 for executing computer program instructions, and a memory 204 for storing executable instructions and data.

The processor 202 may be embodied as any processing resource capable of executing computer program instructions, such as one or more processors on a computer or computing platform(s). The memory 204 may be embodied as any data storage resource, such as one or more disk drives, random access memory, or volatile or non-volatile memory on one or more computing platforms.

The memory 204 has stored thereon several types of computer programs in the form of executable instructions. It has thereon a set of executable instructions 210 for carrying out the methods described herein. It also has stored thereon one or more sets of instructions of trained neural networks or other machine learned models to generate network configurations based on a given set of network requirements for a particular network topology.

The memory 204 may have stored thereon several types of data 280. The data 280 may include, for matrix representations 212, weight parameters 361, 362 and hidden state vectors 216. The matrix representations 212 may include matrices used as input to a neural network (e.g. GNN), as well as matrices updated or generated by the neural network. Both the weight parameters 361, 362 and hidden state vectors 216 are iteratively updated in the training process of the GNN to refine an output of the GNN, which can also be a matrix.

Figure 3:
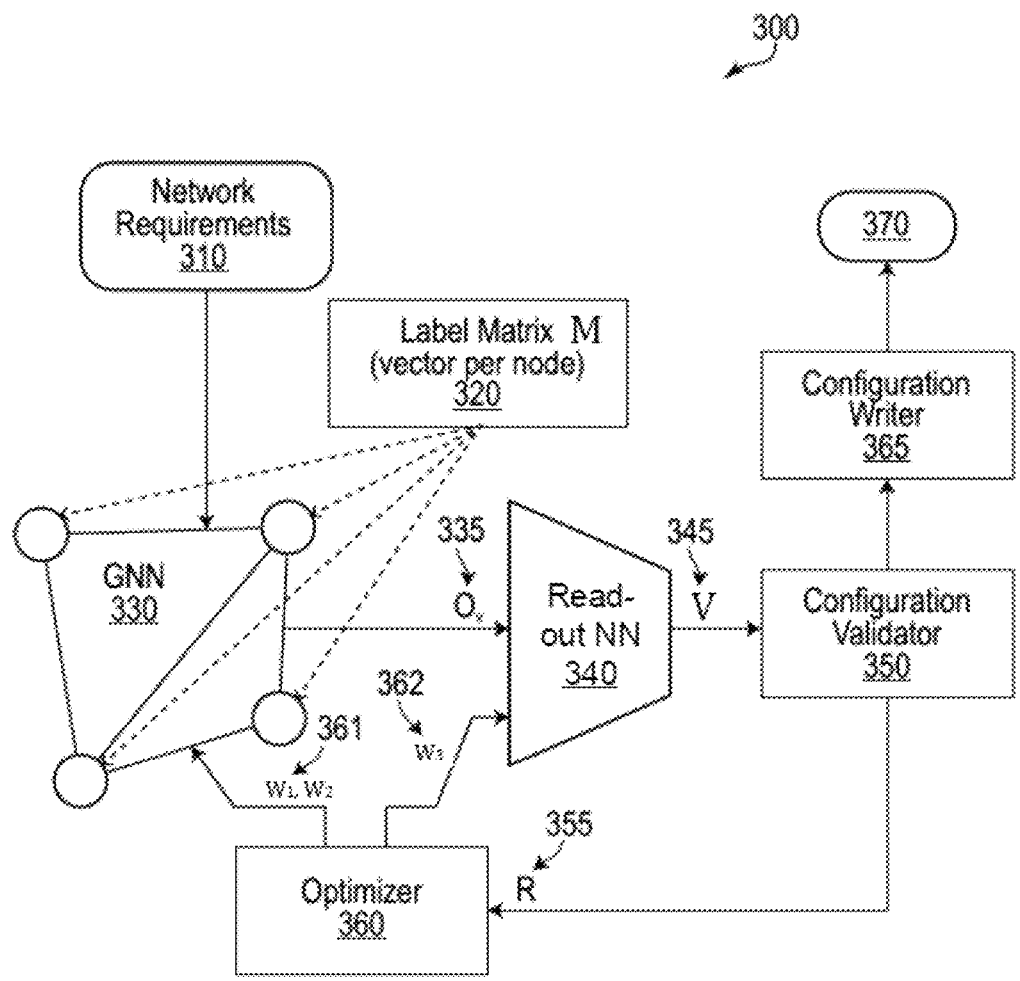
FIG. 3 illustrates an example GNN in training according to example embodiments described herein.

In some example embodiments, the processing system 200 includes a neural network system 300 that synthesizes network configuration given a high-level operator intent. As shown in FIG. 3, a Graph Neural Network (GNN) 330 and a Readout Neural Network (Readout NN) 340 may be implemented to represent a network topology, encode a set of network requirements, and generate network configurations 370. A configuration validator 350 may be used to calculate a reward 355 based on which an optimizer unit 360 may update one or more neural network weight parameters 361, 362 for the GNN. The processing system 200 repeats the neural network tuning steps until fulfilling all operator requirements, as validated by the configuration validator 350. Once validated, the processing system 200 may generate network configurations 370 using a configuration writer 365. The network configurations 370 may then be deployed into one or more routers of the network. A snippet of an example network configurations 370 is shown below.

```
# output Configuration for node A system-view
  ip  ip-prefix  IP_PREFIX_1_100  index  10  permit
    192.168.16.0 24
  ip ip-prefix IP_PREFIX_1_100 index 20 permit 10.10.2.0
    24
  ip ip-prefix IP_PREFIX_1_100 index 30 permit 10.10.3.0
    24
  ip ip-prefix IP_PREFIX_1_100 index 40 permit 10.10.4.0
    24
  route-policy ROUTE_POLICY_1_100 permit node 10
  if-match ip-prefix IP_PREFIX_1_100
  quit
  ip ip-prefix IP_PREFIX_1_2 index 50 permit 10.10 1.0 24
  route-policy ROUTE_POLICY_1_2 permit node 10
  if-match p-prefix IP_PREFIX_1_2
  quit
  ip ip-prefix IP_PREFIX_1_3 index 50 permit 10.10.1.0
    24
``` route-policy ROUTE_POLICY_1_3 permit node 10
if-match ip-prefix IP_PREFIX_1_3
quit
bgp 500
peer 192.168.17.2 as-number 100
peer 192.168.16.2 as-number 500
peer 192 168 16.6 as-number 500
peer 192.168 7.2 route-policy ROUTE_POLICY_1_100 export
peer 192.168.16.2 route-policy ROUTE_POLICY_1_2 export
peer 192.168.16.6 route-policy ROUTE_POLICY_1_3 export
ipv4-family unicast
network 192 168.16.0 24
quit
quit Turning now to the GNN 330, in some embodiments, a set of network requirements 310 may be represented by a matrix M 320. The network requirements 310 may include a network size (e.g., number of border and internal routers), a network typology, a network protocol (e.g., BGP), access permissions, reachability, isolation rules, and so on. In some example embodiments, a set of network requirements 310 can be first represented using one or more programming languages such as YAML, a human-readable data-serialization language. YAML is commonly used for configuration files and in applications where data is being stored or transmitted. An example of a YAML file snippet is shown in FIG. 7. The YAML file may be translated into the input matrix M 320 using one or more programming languages such as Python®.

The network under consideration may have one or more Autonomous Systems, with each Autonomous System having at least one border router and one or more internal routers. Therefore, the network may be represented based on a plurality of routers including border routers and internal routers within each AS. The YAML file in FIG. 7 shows that separate sections are provided for one or more prefixes on each AS, network router interfaces, connectivity between routers, and the operator intent. Parsing such a YAML file can be carried out using a PyYAML package. Thereafter, a sanity check may be performed on the YAML file before running a neural network system 300 as described below. The sanity check can be used to verify that all connected interfaces belong to the same sub-network and no overlap between sub-networks exist.

A processing system 200 may generate two parts of network configuration; i) static configuration and ii) dynamic configuration. The static configuration can be obtained directly from the YAML file such as setting host names and interface addresses. The dynamic configuration is generated based on the output of neural network system 300 taking into consideration static parameters such as router IDs, network prefixes, and so on. In some embodiments, Routing Information Protocol (RIP) may be used to configure full mesh connectivity among internal routers.

An input matrix M 320 is a label matrix used to train the GNN 330. In some embodiments, the input matrix M 320 includes a vector per node in the GNN 330, and each node in the GNN 330 is associated with a respective router from the plurality of routers. For example, each column $M_{ij,\ i=1\ldots m}=[M_{1j}, M_{2j} \ldots M_{mj}]^T$ in the matrix M 320 may include connectivity state information for data packets originated from a router j to all the routers in the network, including itself. For example, a positive connectivity means that there is a routing announcement for data packet between router A and router B.

In addition, each element $M_{ij}$ in M 320 may represent a connectivity state for data traffic between two routers from the plurality of routers based on a set of network requirements. Specifically, an element $M_{ij}$ represents a routing announcement state for data packet between router i and router j, such as a data packet traveling from router j to router i. The value of each element $M_{ij}$ is a real value between [−1, 1], where a value above 0, such as 1, indicates a positive connectivity, which means a data packet from router j to router i may be passed through (e.g. "announced"), and a value equal to or below 0, such as −1, indicates a disconnectivity, which means that a data packet from router j cannot reach router i under any routing configuration condition. The matrix M 320 can also represent when a data packet travels from a source to a destination, and has multiple routes to take, which route(s) may be preferred over other route(s). For example, a value of 1 in element $M_{21}$ in view of a value of 0.8 in element $M_{23}$ indicates that a data packet traveling to router 2 prefers to transit through router 1 over router 3.

GNN 330 is a type of neural network that operates on graph structure. In GNN, G=(V, E) is a directed graph with nodes v ∈ V and edges e ∈ E. In GNN 330, a latent vector $h_v$, which is also referred to as a hidden state vector, is calculated for each node v by applying an aggregation function Agg(·) on all neighboring feature vectors. Such a process is called message passing. The output of the aggregator Agg(·) is passed to a feed-forward neural network to calculate the new hidden state vector for each node, with the feed-forward neural network having a first weight parameter $w_1^t$, as shown in equation (1) below.

$$h_v^t = \sigma(W_1^t \cdot \text{Agg}(h_u^{t-1} | u \in NBR(v))) \quad (1)$$

$$h_v^0 = (x_v) \quad (2)$$

$$O_v = g(h_v^{t \to \infty}, x_v) \quad (3)$$

In the GNN, $h_v^t$ is a hidden state of node v at time step t, generally represented as $h_v$; NBR(v) is the set of all neighbors of node v; and $w_1^t$ is the weight parameters of the feedforward neural network. Agg(·) is the aggregation function which can be a sum(·) or mean(·) function per edge term. These computations are performed for every layer, with the initial condition $h_v^0 = (x_v)$ as shown in equation (2), where $x_v$ is an initial node feature vector. In some embodiments, $X_v$ can be an identity matrix. For example, each column of $X_v$ may be a hot vector $x_v$ that represents a respective router from the plurality of routers.

Here, the definition of a neighborhood NBR for a node v may be predefined. For example, a neighborhood NBR may be defined as an immediate neighbour of node v.

In some embodiments, an activation function, such as a hyperbolic tangent function tanh(·), represented by σ, may be used to limit the value of $h_v$ to [−1, 1] for reasons further explained below.

The output of the GNN, $O_v$ 335, is a matrix including a plurality of elements, each element including a vector generated by passing the hidden state $h_v$ along with node feature $x_v$ to a function g(·), which may be yet another neural network as depicted in equation (3). For example, g(·) can be defined as $\sigma_2(w_2^t h_v^t + b^t)$ at each time step t, which leads to $O_v^{t+1} = \sigma_2(W_2^t h_v^t + b^t)$, where $b^t$ is a bias vector, $\sigma_2$ is another activation function, and $W_2^t$ is the weight parameters of the neural network g(·).

In some embodiments, g(·) may be a simple activation function $\sigma_2$ without another neural network.

In some embodiments, $O_v$ 335 may be [M/V], where M is the matrix M 320 initially generated based on the set of network requirements 310, and V is an edge state matrix V as further described below. A size of $O_v$ 335 may be determined based on the number of routers and physical links in the network. For example, $O_v$ 335 may have a total number of N nodes, where N=(total number of routers+(total number of physical links×2))×total number of routers.

Matrix $O_v$ 335 is forwarded to an optional readout neural network (Readout NN) 340 that acts as a read-out layer. The Readout NN 340 may generate, based on the matrix $O_v$ 335, an edge state matrix V 345 for route announcements or blocks between physical routers for a BGP network. Each column $V_{ij,\ i=1\ \ldots\ m} = [V_{1j}, V_{2j}, \ldots V_{mj}]^T$ in the matrix V 345 may include transmission state information for data packets originated from a router j to all the routers in the network, including itself. Each respective element of the matrix V 345, which may be referred to as a edge state vector, includes transmission state information for each routing session (between each pair of routers) based on an originating router of a data packet.

Figure 4:
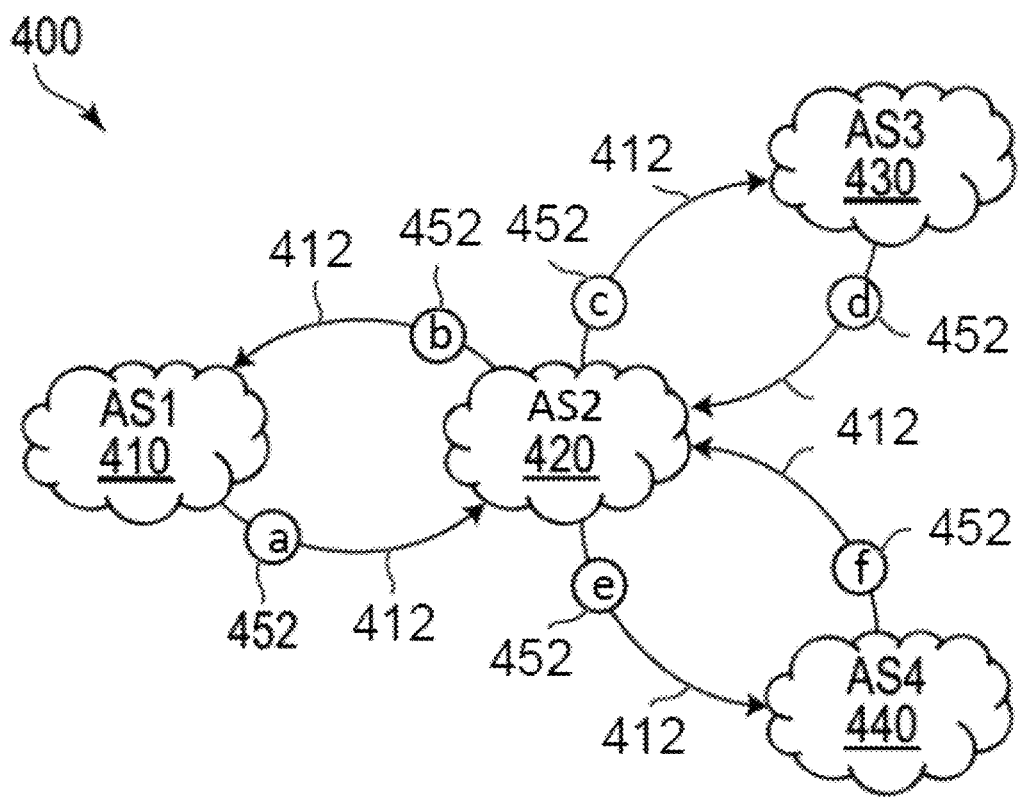
FIG. 4 shows an example network topology with intermediate nodes according to example embodiments described herein.

For example, a network having four border routers (as shown in FIG. 4) may have an edge state matrix V 345 shown below:

$$V = \begin{bmatrix} V_1^{1\to 2} & V_2^{1\to 2} & V_3^{1\to 2} & V_4^{1\to 2} \\ V_1^{2\to 1} & V_2^{2\to 1} & V_3^{2\to 1} & V_4^{2\to 1} \\ V_1^{2\to 3} & V_2^{2\to 3} & V_3^{2\to 3} & V_4^{2\to 3} \\ V_1^{3\to 2} & V_2^{3\to 2} & V_3^{3\to 2} & V_4^{3\to 2} \\ V_1^{2\to 4} & V_2^{2\to 4} & V_3^{2\to 4} & V_4^{2\to 4} \\ V_1^{4\to 2} & V_2^{4\to 2} & V_3^{4\to 2} & V_4^{4\to 2} \end{bmatrix},$$

where $V_z^{x \to y}$ is an edge state vector representing a transmission state for a data packet originated at router (node) z and traveling from router (node) x to router (node) y.

Each edge state vector $V_z^{x \to y}$ has a value representing a transmission state. The value may be a real value between [−1, 1], where a value above 0, such as 1, indicates a data packet will be passed through (e.g. "announcement"), and a value equal to or below 0, such as −1, indicates that a data packet is to be rejected/blocked. In some embodiments, the value can also represent when a data packet travels from a source to a destination, and has multiple routes to take, which route(s) may be preferred over other route(s). For example, a value of 1 in element $V_4^{2 \to 1}$ in view of a value of 0.8 in element $V_4^{3 \to 1}$ indicates that a data packet from router 4 (source) traveling to router 1 (destination) prefers to transit through router 2 over router 3.

The total number of edge state vectors in an edge state matrix V 345 may be determined based on the total number of routers and total number of physical links in a network. For example, for a network having 4 routers and 3 physical links among the 4 routers, there may be a total of 24 elements, as determined by a total number of physical links×a total number of routers×2, and therefore, the edge state vectors may be represented as $V_{ij,\ i=1\ to\ 6,\ j=1\ to\ 4}$.

In some embodiments, the total number of edge state vectors can be reduced by considering only the previous step of routing announcements instead of the total number of routers in the network. That is, $v_z^{x \to y}$ indicates state of the traffic announcement received from node z and is forwarded from node x to node y. For example, for a network having 4 routers and 3 physical links among the 4 routers, the edge state matrix V including 6 edge state vectors $V_{ij,\ i=1\ to\ 3,\ j=1\ to\ 2}$ may be represented as:

$$V = \begin{bmatrix} V_3^{2 \to 1} & V_4^{2 \to 1} \\ V_1^{2 \to 3} & V_4^{2 \to 3} \\ V_1^{2 \to 4} & V_3^{2 \to 4} \end{bmatrix}.$$

Readout NN 340 may include a neural network similar to that of GNN 330. For example, Readout NN 340 may first refine the matrix $O_v$ 335 using equation (4) below:

$$O_v^{t+1} = \sigma_3(W_3^t O_v^t + b^t),$$

where $b^t$ is another bias vector, $\sigma_3$ is another activation function, and $W_3^t$ is the weight parameters of the neural network of Readout NN 340. $W_3^{t=0}$ can be initialized to the identity matrix and b can be initialized to [0]. $O_v^{t+1}$ is then used to generate the edge state matrix V 345. Readout NN 340 is an optional step and may be omitted in some embodiments, depending on for example computing resource constraints.

The configuration validator 350 receives edge state matrix V 345 and calculates a reward R 355 based on a set of predefined rules. The configuration validator 350 may be configured to evaluate the edge state matrix V 345 against set of network requirements 310 (e.g. reachability, isolation, no transit, load balance, and path preferences).

An edge state matrix V 345 is evaluated by the configuration validator 350 at each iteration. For example, the configuration validator 350 may be configured to calculate all shortest paths between each pair of source router and destination router that have a maximum length of 16 hops. This is based on the assumption that all the routers use a Time-to-Live (TTL) field in the IP header as the maximum number of hops that a data packet can travel in its lifetime. Thereafter, the configuration validator 350 may use the calculated shortest paths to generate first-order logic constraints, which are then used to validate if the edge state matrix V 345 satisfy the network requirements 310, including reachability and isolation requirements. A reward R 355 may be calculated based on a ratio of satisfied network requirements to all network requirements 310. When all network requirements 310 are all satisfied, the reward R 355 has a value equal to, or sufficiently close to a predefined threshold value (e.g. 1 or 0.99999), in which case the processor 202 may forward the edge state matrix 345 to a configuration writer 365 for generating the network configurations 370.

When the reward the calculated reward R 355 is less than the predefined threshold value, it is sent to an optimizer unit 360 which may use various optimization strategies to update one or more neural network parameters 361, 362 to refine the GNN output $O_v$ 335 and edge state matrix V 345. Neural network parameters 361 may include one or more weight parameters $W_1^t$ and/or $W_2^t$ from the GNN 330, and neural network parameters 362 may include a weight parameter $W_3^t$ from the Readout NN 340, when Readout NN 340 is implemented.

In some embodiments, Reinforcement Learning (RL) is implemented by the optimizer unit 360 to refine the weight parameters 361, 362. RL is one of the machine learning paradigms that trains a software agent to automatically determine the ideal behavior at a given time step. Such behavior that maps from given system states to suitable actions is called a policy. Alternatively, a Deep Reinforcement Learning (DRL) model may be used in an implementation of the optimizer unit 360. Both RL and DRL are designed originally for systems with discrete action space. Recently, DRL has been extended for continuous action space systems by allowing the agent to generate the mean $\mu$ and the standard deviation $\sigma$ that define the ideal action in a continuous space. Given that the GNN 330 and the Readout NN 340 eventually generate an edge state matrix V 345 for all routing announcement sessions, a multivariate normal distribution is required to make a a square matrix. Thus, the complexity and the required computational power of a DRL model increases linearly with the square of the number of actions.

In some embodiments, instead of using RL or DRL, evolution strategies (ES) algorithms may be used to implement the optimizer unit 360. ES algorithms may provide faster convergence rate and high parallelization compared to RL. An ES algorithm during execution resembles hill-climbing optimization problem in high dimension space. Therefore, it does not require back-propagation, thereby requiring less time and computational power as compared to RL and DRL. Further, ES algorithms are highly parallelizable because the communication required between workers is limited to a few scalars, namely, the calculated rewards and random generator seeds.

In some embodiments, a Covariance Matrix Adaptation Evolution Strategy (CMA-ES) may be implemented to improve the output as a black-box optimization problem. The processor 202 may use the calculated reward R 355 to decide how to update neural network parameters while improving the output. FIG. 8 shows an example ES algorithm 800 as performed by a processor 202 based on instructions 210 stored in memory 204. The ES algorithm 800 is designed to randomly sample a set of p solution candidates where $p \in O \ldots P-1$ in a multidimensional Gaussian distribution as depicted in line 5 and 6 in ES algorithm 800. Next, the neural network weights 361, 362 are updated (line 7), where $\theta_t$ is the weight at current time step t and $\sigma$ is the noise standard deviation. In lines 8 and 9, the processor 202 performs a feedforward process, by generating a new output via GNN 330 and optionally the Readout NN 340 based in the updated weight parameters 361, 362, and calls the configuration validator 350 to calculate an updated reward R 355. If the updated reward R 355 meets a predefined threshold value (e.g., 1), the processor 202 sends the edge state matrix V 345 to the next component, which is the configuration writer 365 (lines 10-12). Otherwise, the processor 202 updates the model weights based on the calculated gradient (line 14), and repeats the same process in the next iteration, until the updated reward R 355 meets the predefined threshold value.

ES algorithm is easy to scale in distributed environments. Several studies show that ES achieves similar results as RL in shorter wall clock time by distributing the calculation load over hundreds of workers.

After tuning neural network parameters 361, 362 and when the reward R 355 reaches a predefined threshold value (e.g. 1), the edge state matrix V 345 is forwarded to the configuration writer 365. The configuration writer 365 is operable to convert the edge state matrix V 345 into a set of valid vendor-specific network configuration 370, which can be then deployed into one or more routers in the network.

Two example networks 400 and 500, and the implementation of a neural network system 300 for each of the networks 400, 500 will now be described. Turning now to FIG. 4, which shows an example EGP graph of a network 400. The network 400 has four Autonomous Systems (AS1, AS2, AS3, AS4) with each AS having a respective border router represented by an original node 410, 420, 430, 440. The EGP graph includes intermediate nodes 452 for training a GNN 330. An intermediate node 452 does not represent a physical router, instead, it is a node 452 added for each one-direction path 412 between two original nodes 410, 420, 430, 440. Therefore, a bidirectional link between a pair of original nodes may have two intermediate nodes added in-between. Assuming the neural network system 300 is only concerned with generating network configurations for the exterior border routers based on Border Gateway Protocol (BGP), the internal routers within each AS are not shown nor taken into consideration in this particular example embodiment. BGP is the standard protocol for inter-domain routing and is selected as an example protocol for implementing the neural network system 300. It is worth noting that the neural network system 300 may be implemented for other types of networks such as MPLS, with a modified configuration validator.

For the network 400, the network requirements 310 may indicate that: (1) AS2 can connect to each of AS1, AS3 and AS4 (reachability); and (2) AS3 cannot reach AS4 under any circumstances (and vice versa). Furthermore, there are three direct physical communication links, each between AS1 and AS2, AS2 and AS3, and AS2 and AS4, respectively.

In order to generate an input matrix M 320 for training the neural network system 300, two intermediate nodes 452 per physical link (one per direction) are added in the EGP graph. Based on the nodes 410, 420, 430, 440, and the network requirements 310, the input matrix M 320 may be generated as:

$$M = \begin{bmatrix} 1 & 1 & 1 & 1 \\ 1 & 1 & 1 & 1 \\ 1 & 1 & 1 & -1 \\ 1 & 1 & -1 & 1 \end{bmatrix} \begin{matrix} AS1 \\ AS2 \\ AS3 \\ AS4 \end{matrix}$$

$$\begin{matrix} AS1 & AS2 & AS3 & AS4 \end{matrix}$$

An initial feature matrix $X_V$ including four feature vectors $x_v$ may be represented as:

$$Xv = \begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

$$\begin{matrix} AS1 & AS2 & AS3 & AS4 \end{matrix}$$

where $x_{AS1}=[1\ 0\ 0\ 0]^T$, $x_{AS2}=[0\ 1\ 0\ 0]^T$, $x_{AS3}=[0\ 0\ 1\ 0]^T$, $X_{AS4}=[0\ 0\ 0\ 1]^T$.

Both the input matrix M 320 and the initial feature matrix $X_v$ are used to train the GNN 330 based on the equations below:

$$h_v^t = \sigma(W_1^t \cdot Agg(h_u^{t-1} | u \in N\ BR(v))) \quad (1)$$

$$h_v^0 = (x_v) \quad (2)$$

$$O_v = g(h_0^{t \to \infty}, x_v) \quad (3)$$

At time step t=0: $h_{AS1}^{t=0}=[1\ 0\ 0\ 0]^T$, $h_{AS2}^{t=0}=[0\ 1\ 0\ 0]^T$, $h_{AS3}^{t=0}=[0\ 0\ 1\ 0]^T$, and $h_{AS4}^{t=0}=[0\ 0\ 0\ 1]^T$.

After each iteration, an output $O_v$ 335 may be generated by the GNN 330, where $$O_v = \begin{bmatrix} M \\ V \end{bmatrix},$$

M being the matrix M 320 initially generated based on the set of network requirements 310, and v being the edge state matrix V 345. More specifically:

$$Ov = \begin{bmatrix} 1 & 1 & 1 & 1 \\ 1 & 1 & 1 & 1 \\ 1 & 1 & 1 & -1 \\ 1 & 1 & -1 & 1 \\ V_1^{1\to 2} & V_2^{1\to 2} & V_3^{1\to 2} & V_4^{1\to 2} \\ V_1^{2\to 1} & V_2^{2\to 1} & V_3^{2\to 1} & V_4^{2\to 1} \\ V_1^{2\to 3} & V_2^{2\to 3} & V_3^{2\to 3} & V_4^{2\to 3} \\ V_1^{3\to 2} & V_2^{3\to 2} & V_3^{3\to 2} & V_4^{3\to 2} \\ V_1^{2\to 4} & V_2^{2\to 4} & V_3^{2\to 4} & V_4^{2\to 4} \\ V_1^{4\to 2} & V_2^{4\to 2} & V_3^{4\to 2} & V_4^{4\to 2} \end{bmatrix},$$

$$M = \begin{bmatrix} 1 & 1 & 1 & 1 \\ 1 & 1 & 1 & 1 \\ 1 & 1 & 1 & -1 \\ 1 & 1 & -1 & 1 \end{bmatrix}, \text{ and}$$

$$V = \begin{bmatrix} V_1^{1\to 2} & V_2^{1\to 2} & V_3^{1\to 2} & V_4^{1\to 2} \\ V_1^{2\to 1} & V_2^{2\to 1} & V_3^{2\to 1} & V_4^{2\to 1} \\ V_1^{2\to 3} & V_2^{2\to 3} & V_3^{2\to 3} & V_4^{2\to 3} \\ V_1^{3\to 2} & V_2^{3\to 2} & V_3^{3\to 2} & V_4^{3\to 2} \\ V_1^{2\to 4} & V_2^{2\to 4} & V_3^{2\to 4} & V_4^{2\to 4} \\ V_1^{4\to 2} & V_2^{4\to 2} & V_3^{4\to 2} & V_4^{4\to 2} \end{bmatrix}.$$

That is, the GNN 330 and Readout NN 340 are trained to predict a respective transmission state for each intermediate node 452 from all the intermediate nodes 452, given the labels of nodes 410, 420, 430, 440. The transmission state for each intermediate node from all intermediate nodes are captured in the edge state matrix V 345.

Once the output $O_v$ 335 is generated by the GNN 330, it may be sent to the Readout NN 340 for a further refinement by a readout neural network layer, and the edge state matrix V 345 is extracted from the $O_v$ 335 and sent to the configuration validator 350 for determining the reward R 355.

For example, in order to verify that path between AS1 and AS3 is active, the configuration validator 350 calculates all possible paths between AS1 and AS3, which can only be routed via AS2. Then the configuration validator 350 verifies that $V_1^{1\to 2}>0$ and $V_1^{2\to 3}>0$ (for the forward direction) and $V_3^{3\to 2}>0$ and $V_3^{2\to 1}>0$ for the backward direction. In addition, to validate the above-mentioned isolation requirement between AS3 and AS4, the configuration validator 350 needs to verify that all paths between AS3 and AS4 are disabled, which means: $V_3^{3\to 2}\leq 0$ or $V_3^{2\to 4}\leq 0$ for the forward direction, and $V_4^{4\to 2}\leq 0$ or $V_4^{2\to 3}\leq 0$ for the backward direction. Note that only one physical link (i.e., either between AS2 and AS4 or between AS2 and AS3) needs to be disabled per direction for the mentioned isolation requirement to be satisfied.

When R 355 has a value equal to, or sufficiently close to a predefined threshold value (e.g. 1 or 0.99999), the edge state matrix V 345 is sent to a configuration writer 365 for generating the network configurations 370. Otherwise, the reward R 355 is sent to an optimizer unit 360 for refining the neural network weight parameters 361, 362.

The optimizer unit 360 may use an ES algorithm similar to the one shown in FIG. 8 to refine the weight parameters 361 in GNN 330 and optionally the weight parameters 362 in Readout NN 340. The GNN 330 and Readout NN 340 are executed by the processor 202 in a new iteration using the refined weight parameters 361, 362 to generate an updated output matrix $O_v$ 335 and an updated edge state matrix V 345. The configuration validator 350 determines an updated reward R 355 based on the updated edge state matrix V 345, and continues the training process until the updated reward R 355 reaches a predefined threshold value, or until a predefined maximum number of iterations has been reached.

Once R 355 has reached the predefined threshold value, the final edge state matrix V 345 is sent to the configuration writer 365 for generating the final set of network configurations 370 for the network 400 shown in FIG. 4.

Figure 5:
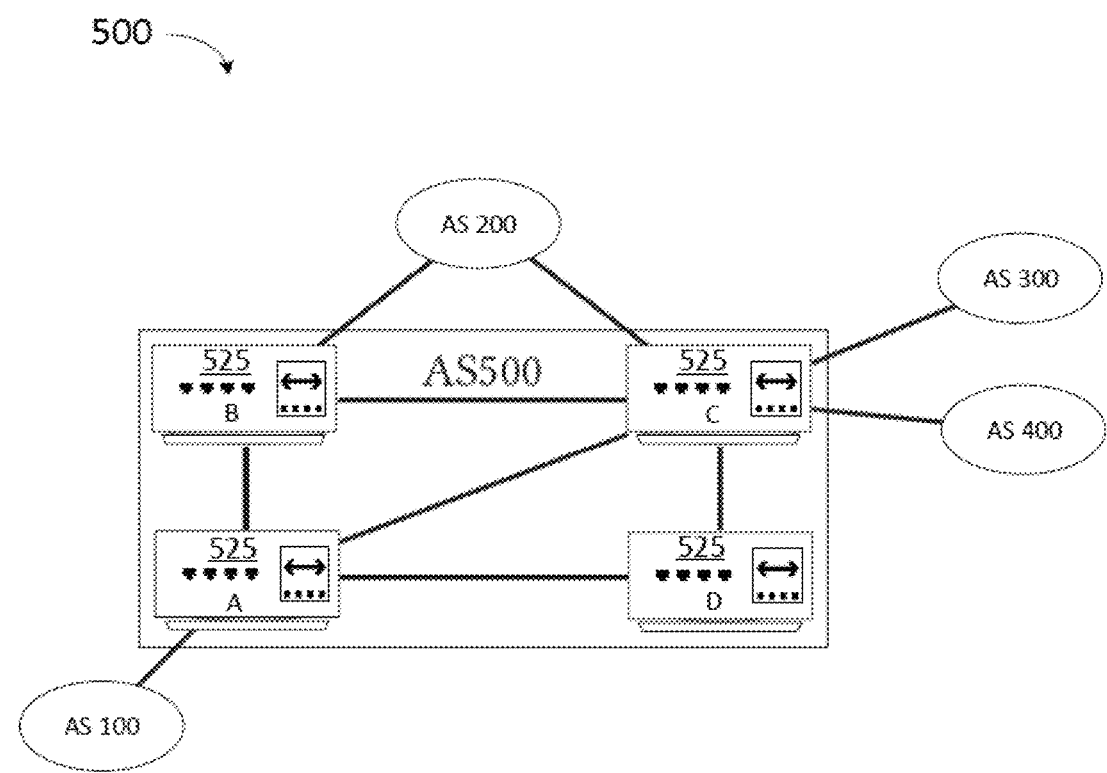
FIG. 5 shows another example network topology with network paths shown based on a set of network requirements.

Referring now to FIG. 5, which shows another example network 500 having five Autonomous Systems AS100, AS200, AS300, AS400 and AS500. In such an example, the neural network system 300 may be implemented to generate the network configurations for an ISP, AS500, which has four internal routers A, B, C, D 525. AS500 is connected to one client network AS100 and three peer networks, namely AS200, AS300 and AS400. A set of network requirements 310 may include:

1) AS100 can reach all peer networks AS200, AS300 and AS400.
2) AS500 applies no transit rule, i.e., AS200, AS300 and AS400 can't reach one another through AS500.
3) Data packets destined to AS200 prefers router B over router C.

Figure 6:
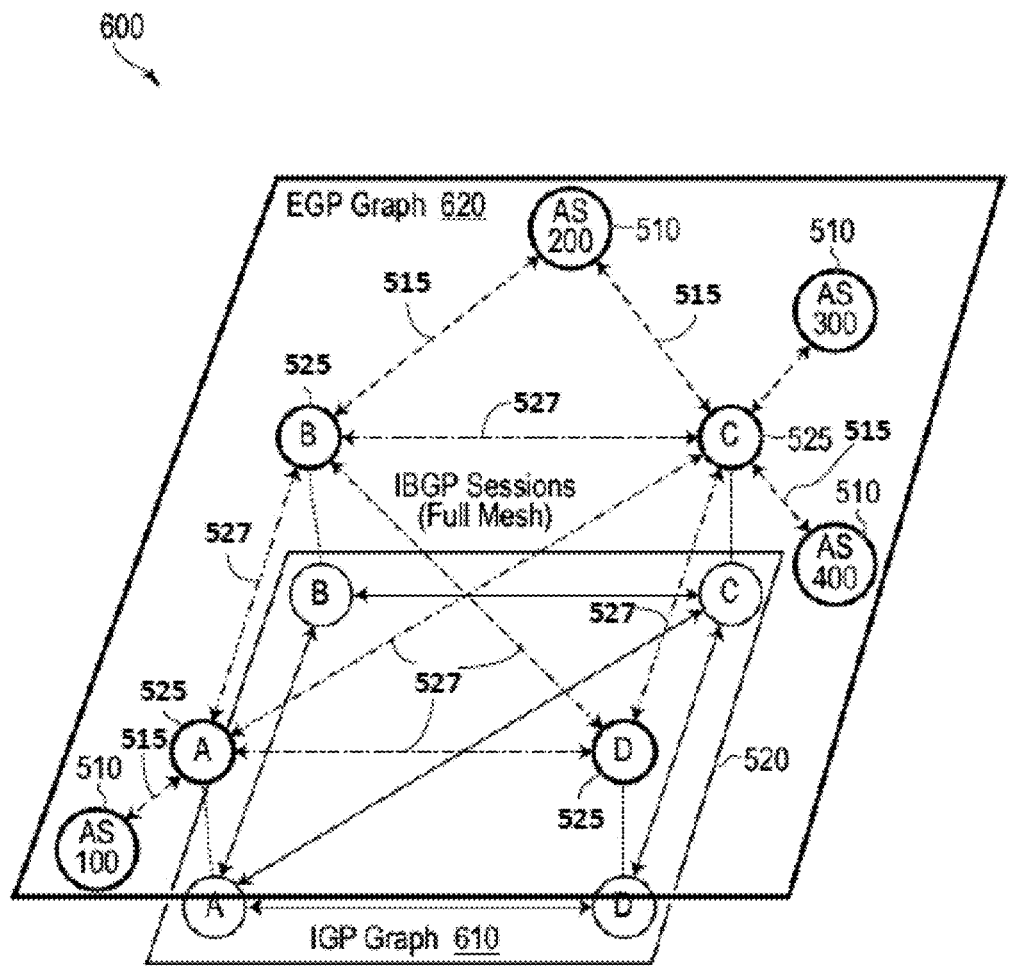
FIG. 6 illustrates an example GNN graph including an example Exterior Gateway Protocol (EGP) graph and an example Interior Gateway Protocol (IGP) based on the network topology shown in FIG. 5.
Figure 9:
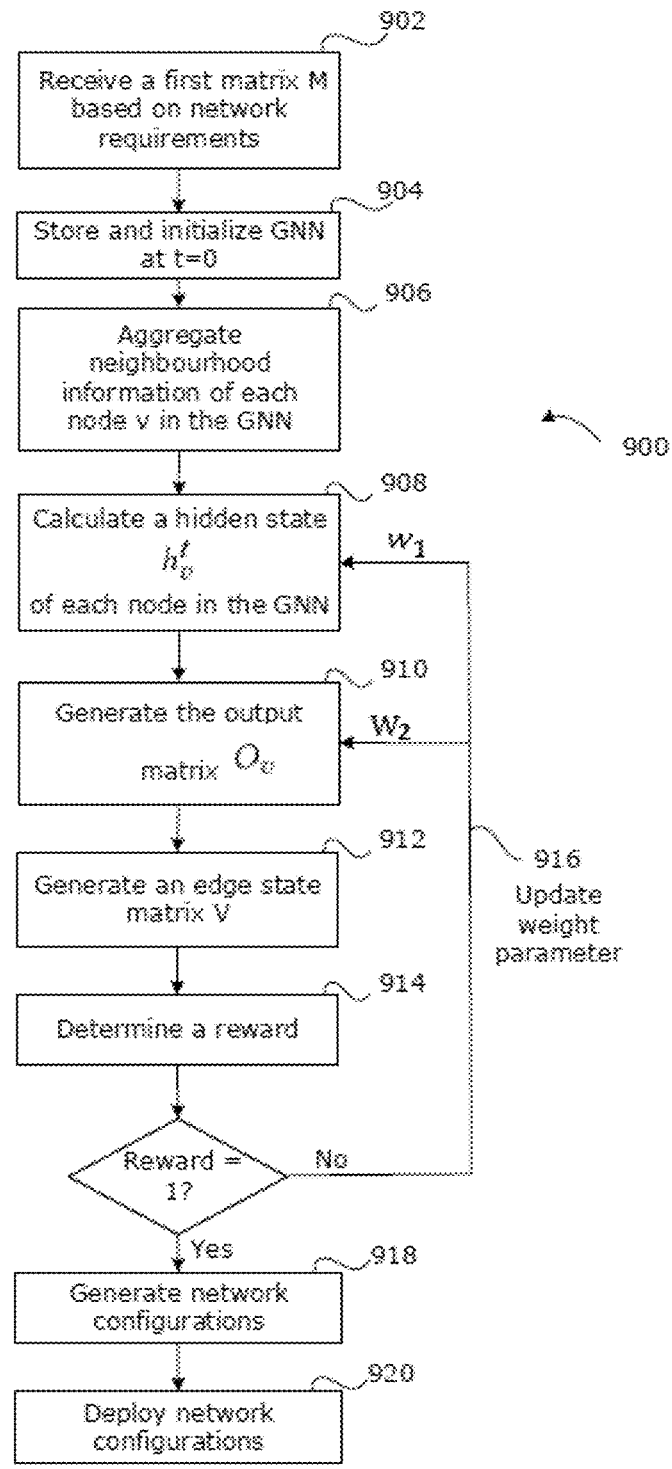
FIG. 9 is a flowchart of an example method for generating a network configuration using a GNN according to example embodiments described herein.

FIG. 9 is a flowchart of an example method 900 for generating network configuration 370 for a given network, such as network 500 as shown in FIG. 5 using a GNN 330 and optionally a Readout NN 340 performed by a processor 202 of a neural network system 300. The example method 900 will be described in conjunction with FIG. 6 below.

At step 902, the processor 202 receives the input matrix M 320 generated based on the set of network requirements 310 listed above. The input matrix M 320 is a labelled matrix generated based on an GNN graph 600 shown in FIG. 6. As illustrated, the GNN graph 600 has an Exterior Gateway Protocol (EGP) graph 620 and an Interior Gateway Protocol (IGP) 610 based on the network 500 in FIG. 5. GNN graph 600 represents the control plane where border routers are represented as external nodes 510 and internal routers within the ISP 520 are represented as internal nodes 525, and a connectivity state (e.g., pass through or block) for each path between two routers are represented by an edge. Each node v 510, 525 may represent a border router in a client network AS100 or a peer network AS200, AS300, AS400, or an internal router in the ISP AS500.

In this example, the EGP 620 shows all internal routers within AS500 520 as nodes 525 in a full mesh scheme to represent IBGP sessions. A full mesh scheme means that the internal routers are interconnected with one another, shown as bidirectional links 527 in the EGP 620. It also contains the external routers as nodes 510 with bidirectional links 515 based on the set of network requirements 310 listed above. Each bidirectional link 515, 527 shown in the EGP 620 means that at least some data packets traveling from either direction will be allowed to pass through (also known as "announced").

In some embodiments, instead of a full mesh scheme, the GNN graph 600 may adapt a different network topology to represent internal routers within an AS. Regardless of the type of network topology selected to represent internal routers, the internal routers are reproduced as nodes 525 in the EGP graph 620, so that a first, or input matrix M 320 may be determined based on the EGP graph 620.

In order to generate the input matrix M 320, two intermediate nodes per edge (i.e., one per direction) are added to each link 515, 527. Next, instructions in PyYAML or another programming language may be used to generate input matrix M 320, which contains labels for the nodes 510, 525 based on the set of network requirements 310. The input matrix M 320 is shown below:

$$M = \begin{bmatrix} 1 & 1 & 1 & 1 & 1 \\ 1 & 1 & -1 & -1 & 1 \\ 1 & -1 & 1 & -1 & 1 \\ 1 & -1 & -1 & 1 & 1 \\ 1 & 1 & 1 & 1 & 1 \\ 1 & 0.9 & 1 & 1 & 1 \end{bmatrix}.$$

Each element $M_{ij}$ in M 320 represents a connectivity state for data traffic between two routers from the plurality of routers in AS100, AS200, AS300, AS400 and AS500. For example, $M_{11}$ represents a connectivity state for a data packet traveling from a router in AS100 to a router in AS100, $M_{21}$ represents a connectivity state for a data packet traveling from a router in AS100 to a router in AS200, $M_{22}$ represents a connectivity state for a data packet traveling from a router in AS200 to a router in AS200. Specifically, an element $M_{ij}$ may represent a connectivity state for data packet traveling between router i and router j, for example from router j to router i. The value of each element $M_{ij}$ is a real value between [−1, 1], where a value above 0, such as 1, indicates a positive connectivity, which means a data packet from router i to router j may be passed through (e.g. "announced"), and a value equal to or below 0, such as −1, indicates a disconnectivity, which means that a data packet from router i cannot reach router j under any routing configuration condition. The matrix M 320 can also represent when a data packet travels from a source to a destination, and has multiple routes to take, which route(s) may be preferred over other route(s). For example, a value of 1 in element $M_{12}$ in view of a value of 0.8 in element $M_{32}$ indicates that a data packet traveling to router 2 prefers to transit through router 1 over router 3.

For greater clarity, each column of the input matrix M 320 may be associated with a respective router from AS100, AS200, AS300, AS400 and AS500, as illustrated below:

| | AS100 reaches | AS200 reaches | AS300 reaches | AS400 reaches | AS500 reaches | |
|---|---|---|---|---|---|---|
| M = | 1 | 1 | 1 | 1 | 1 | AS100 |
| | 1 | 1 | −1 | −1 | 1 | AS200 |
| | 1 | −1 | 1 | −1 | 1 | AS300 |
| | 1 | −1 | −1 | 1 | 1 | AS400 |
| | 1 | 1 | 1 | 1 | 1 | A, B & D |
| | 1 | 0.9 | 1 | 1 | 1 | C |

The connectivity between AS100 and each of AS200, AS300, AS400, as well as internal routers A, B, C, D within AS500 are represented in the first column of the input matrix M 320. An element having a value greater than zero (e.g. 1) indicates a positive connectivity, i.e., a data packet may be passed through. An element having a value equal to or less than zero indicates a disconnectivity, i.e., blocked (also known as "isolation").

Similarly, the connectivity between AS200 and each of AS100, AS300, AS400 and AS500 is encoded in the second column of the input matrix M 320, based on the set of network requirements 310. For example, the no transit rule for AS500 means that AS200, AS300, AS400 are isolated, so the elements in the second column of M 320 corresponding to AS300 and AS400 is set to a value less than zero: e.g., −1. For another example, AS200 can reach AS100 and AS500, thus, the corresponding elements in the second column of M 320 for AS100 and internal routers within AS500 are set to a value greater than zero, e.g. 1. For yet another example, a data path preference listed the network requirements 310 states that traffic destined to AS200 prefers router B over C in AS500. This requirement is satisfied by setting the element, in the second column of M 320, designated for A, B, D (preferred) to be a value higher than that of the element for C. For example, the values may be set to 1 and 0.9, respectively.

Same process may be repeated for AS300, AS400 and AS500 to generate the rest of the input matrix M 320. As there are a total of five autonomous systems or networks under consideration, there are 5 columns in the input matrix M 320.

Next, an initial feature matrix Xv including five feature vectors $x_v$ may be set to an identity matrix having a size of 5×5, with each corresponding node index set to 1.

Both the input matrix M 320 and the initial feature matrix Xv are used to train the GNN 330. Specifically, at step 904 of the method 900, the processor 202 stores and initializes the GNN 330 at time step t=0: $h_{AS100}^{t=0}=[1\ 0\ 0\ 0\ 0]^T$, $h_{AS200}^{t=0}=[0\ 1\ 0\ 0\ 0]^T$, $h_{AS300}^{t=0}=[0\ 0\ 1\ 0\ 0]^T$, $h_{AS400}^{t=0}=[0\ 0\ 0\ 1\ 0]^T$, and $h_{AS500}^{t=0}=[0\ 0\ 0\ 0\ 1]^T$. If a Readout NN 340 is implemented, Readout NN 344 can be also initialized in a similar manner.

GNN 330 is next trained to predict an output matrix $O_v$ 335 including information representing a connectivity state for each intermediate node from all the intermediate nodes, given the labels of original nodes 510, 525. The training process includes, at step 906, aggregating neighbourhood information of each node from the plurality of nodes v of the GNN. A neighbour (NBR) may be defined as an immediate neighbour of a node. For example, in FIG. 6, node AS200 has two neighbour nodes: B and C.

At step 908, the processor 202 calculates a hidden state vector $h_v^t$ of each node from the plurality of nodes v of the GNN 330 and optionally Readout NN 340, based on the aggregated neighbourhood information from step 906.

At step 910, the processor 202 generates the output matrix $O_v$ 335 based on the hidden state vector $h_v^t$ of each node v, where $$O_v = \begin{bmatrix} M \\ V \end{bmatrix},$$

M being the matrix M 320 initially generated based on the set of network requirements 310, and V being the edge state matrix V 345.

At step 912, the processor 202 generates an edge state matrix V 345 based on the output matrix $O_v$ 335. Each element of the edge state matrix V 345 has a value representative of a transmission state for each intermediate node from all intermediate nodes. The edge state matrix V 345 contains a plurality of edge state vectors, where each edge state vector $V_z^{x \rightarrow y}$ has a value representative of a transmission state for a data packet originated at router z and traveling from router x to router y.

For instance, an edge state vector $V_z^{B \rightarrow AS200}$, $z \in AS100$, AS200, AS300, AS400, AS500, represents transmission states for an intermediate node between node B and AS200. If $V_B^{x \rightarrow AS200} = [1 \; 1 \; -1 \; -1 \; 1]^T$, it indicates that an EBGP session between router B and AS200 must block data packets for AS300 and AS400. To that end, a semi-supervised classification task is run on the GNN. The training is done using a masked Mean Squared Error (MSE) loss function for original nodes 510, 525 that represent physical routers (e.g. a border or internal router).

At step 914, the processor 202 pass the output matrix $O_v$ 335 and/or the edge state matrix V 345 to the configuration validator 350, which is configured to validate the satisfiability of network requirements 310 and generates a reward R 355. A predefined threshold value may be set to 1, when the reward R 355 is a ratio of satisfied network requirements to a total number of network requirements 310.

When R 355 has a value less than the predefined threshold value, the reward R 355 is sent to, at step 916, an optimizer unit 360 for refining the neural network weight parameters 361, 362. There may be one or more neural network weight parameters, including a $W_1{}'$ and a $W_2{}'$ 361 for GNN 330, and optionally a $W_3{}'$ for Readout NN 340.

The optimizer unit 360 may use an ES algorithm similar to the one shown in FIG. 8 to refine the weight parameters 361 in GNN 330 and optionally the weight parameters 362 in Readout NN 340. The GNN 330 and Readout NN 340 are executed by the processor 202 in a new iteration using the refined weight parameters 361, 362 to generate an updated output matrix $O_v$ 335 and an updated edge state matrix 345. The configuration validator 350 determines an updated reward R 355 based on the updated edge state matrix V 345, and continues the training process until the updated reward R 355 reaches a predefined threshold value, or until a predefined maximum number of iterations has been reached.

When R 355 has a value equal to, or sufficiently close to a predefined threshold value (e.g. 1 or 0.99999) at step 918 of the method 900, the edge state matrix V 345 is sent to a configuration writer 365 for generating the network configurations 370 for the network 500. An example table of BGP sessions is presented in FIG. 10. This table illustrates what each router (Source) should announce over possible BGP sessions to its neighbors. In addition, a preference index is set to each announcement, if required, to indicate path preference. This preference index is translated into a local-preference value in the import filter for the corresponding BGP session.

To validate the network configuration 370 generated by the neural network system 300, the network configuration 370 can be tested using eNSP network simulator, copying the network configuration 370 into each router device in a simulated network similar to the network 500. Table 1 shown below shows snippet of BGP and IP routing tables for router B and C. It can be seen that router B assigns one route to AS200; router C has two routes to AS200 and it prefers routes learned from router B, IP: 10.10.2.0, with local pref=10100 over the other route. In addition, the last row indicates that router C adopted that route in its IP routing table.

TABLE 1

BGP routing table at routers B and C

<RouterB>display bgp routing-table

BGP Local router ID is 192.168.16.2
*>i 10.10.1.0/24 1.1.1.1 0 100 0 100i
*> 10.10.2.0/24 192.168.18.2 0 0 200i <RouterC>display bgp routing-table BGP Local router ID is 192.168.16.6
Network NextHop MED LocPrf PrefVal Path/Ogn
*>i 10.10.1.0/24 1.1.1.1 0 100 0 100i
*>i 10.10.2.0/24 1.1.1.2 0 10100 0 200i <RouterC>display ip routing-table Route Flags: R—relay, D—download to fib
10.10.2.0/24 IBGP 255 0 RD 1.1.1.2 Ethernet0/0/0

At step 920 of the method 900, the network configuration 370 generated by the neural network system 300 may be deployed into the physical routers of the network 500.

A snippet of the generated configuration 370 is displayed in Table 2 below, which shows router B being set as the local-preference for announcements coming from AS200. Therefore, traffic destined to AS200 prefers router B over C.

TABLE 2

BGP configuration snippet ip ip-prefix PREFIX_B_A_10100 index 90 permit <AS200 prefixes>
route-policy ROUTE_POLICY_B_A permit node 20
if-match ip-prefix PREFIX_B_A_10100
apply local-preference 10100
bgp 500
peer 192.168.18.2 as-number 200 !peer with AS200's router IP
peer 1.1.1.1 as-number 500 !peer with a local router
peer 1.1.1.1 route-policy ROUTE_POLICY_B_A export Experiment I—Feasibility To demonstrate the feasibility of the neural network system 300, experiment I is conducted based on the network topology in FIG. 5, as represented in a YAML file. That file contains network basic information such as interfaces' addresses, and prefixes of each AS. The GNN 330 is trained for 150 episodes and generates a valid BGP configuration with a 93% success rate. When the GNN 330 fails to achieve a solution, the optimizer unit 360 is run to update the weight parameters 361 of the GNN 330. In the experiment, the weights of the GNN 330 are initialized to the identity matrix. In addition, hyper-parameters in the optimizer unit 360 using an ES algorithm are set as follow: population number p=50, σ=0.5 and learning rate $l_r$=0.002.

Figure 11:
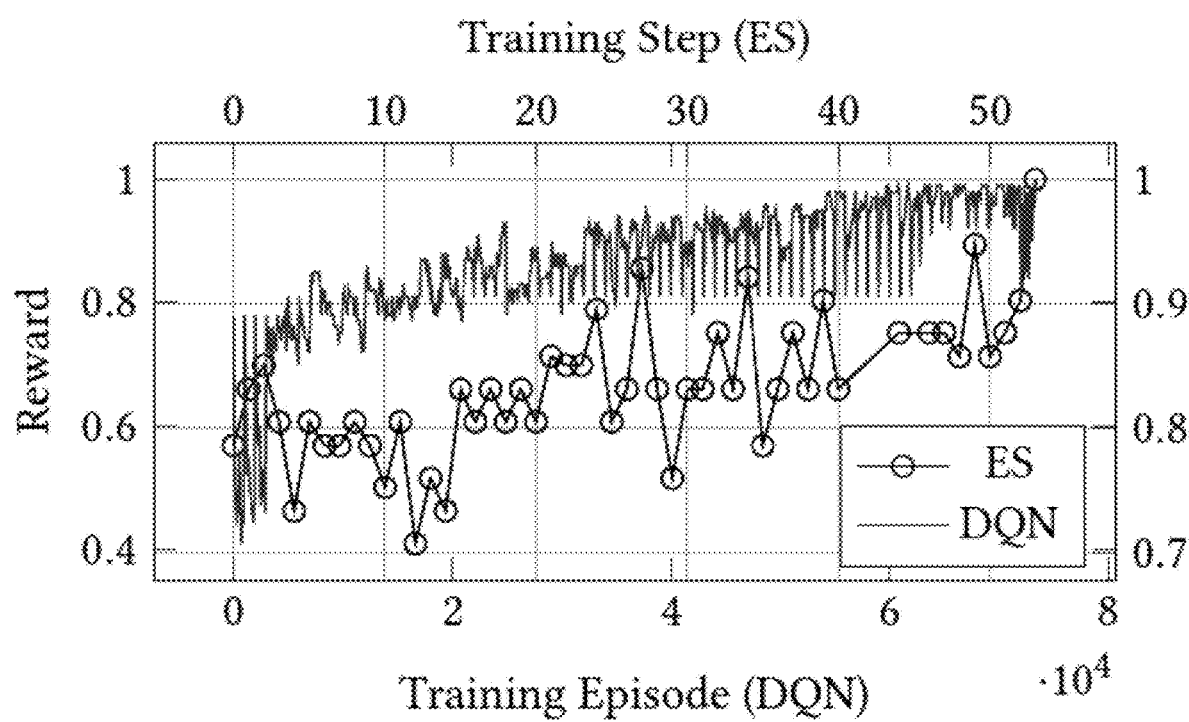
FIG. 11 depicts rewards achieved in each training episode as performed by a GNN with an optimizer algorithm according to example embodiments described herein.

FIG. 11 depicts the best rewards achieved in each training episode. One can notice that the optimizer unit 360 using an ES algorithm indeed succeeds in achieving a valid solution in less than 60 training episodes. For the sake of comparison, instead of using an ES algorithm, in a different experiment, a DRL agent trained to take an action given the current state matrix value is used by the optimizer unit 360. Specifically, a Deep Q-network (DQN) algorithm is adopted for the DRL agent, and the environment is defined to be the edge state matrix V 345. A discrete action space is defined as $A(\cdot)=1, 2, \ldots, m$ where m is the number of elements in edge state matrix V 345. An action function is defined to flip the state matrix element corresponding to the selected action. In addition, a discount factor γ is set to 0.99 and exploration versus exploitation factor is defined as $\in = 0.01 + 0.99 * e^-$ $decay*step$ where decay=0.001. FIG. 11 shows that DQN succeeds in achieving a valid solution, however, the training takes longer as expected (80,000 episodes). Similar results are achieved with other DRL algorithms such as Proximal Policy Optimization (PPO) and Advantage-Actor-Critic (A2C) but were omitted for brevity.

Experiment II—Scalability

In this experiment, a scalability of the neural network system 300 is demonstrated by generating a network-wide configuration for a set of randomly generated networks with a different number of nodes using a Python® NetworkX library. Network nodes are divided into three categories (clients 40%, peers 30%, and providers 30%), and the network requirements are defined as follows:
1) clients and peers can reach all nodes;
2) clients apply no-transit rule; i.e., cannot carry traffic between peers or providers;
3) providers can reach both clients and peers; and
4) providers are isolated from each other.

Figure 12:
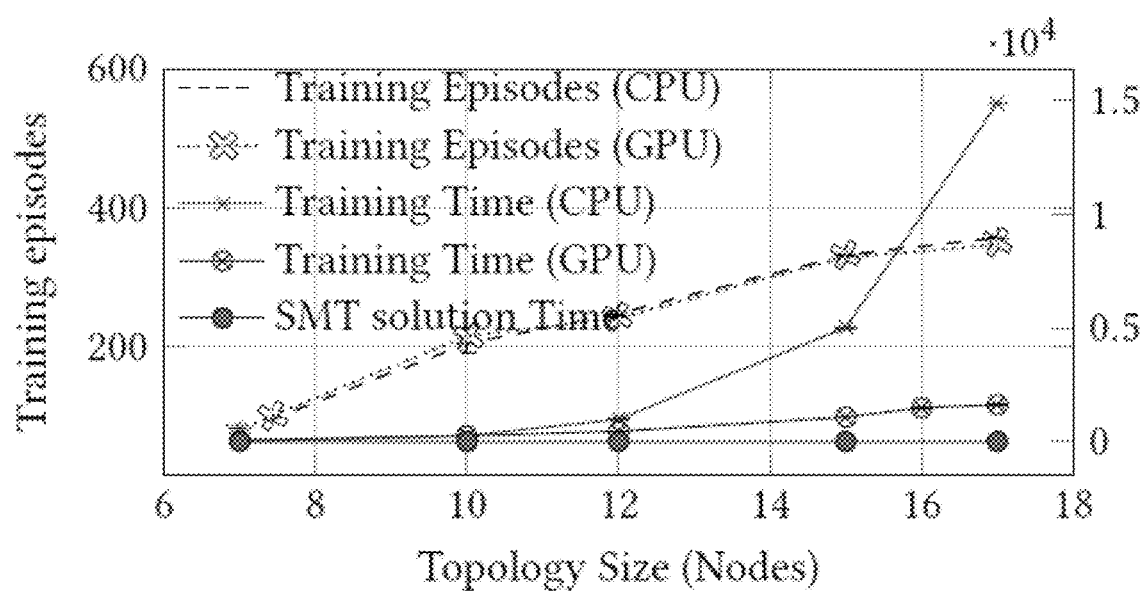
FIG. 12 depicts training episodes and training wall clock time taken to train a GNN versus network topology size.

This experiment is conducted on a virtual machine with a 4-core Xeon processor and 8 Gigabytes of memory. FIG. 12 shows the training episodes and training wall clock time taken by the neural network system 300 versus a network size represented by the number of nodes. One can see that the number of training episodes increases linearly with network size. However, the training wall clock time increases exponentially with network size.

FIG. 12 also depicts the results of running the same experiment using Nvidia GTX 1060 Graphics Processing Unit (GPU). One can notice that with GPU, the wall clock time increases linearly with network size. It may be concluded that hardware acceleration is correlated with less execution time.

A Satisfiability Modulo Theories (SMT)-based system is compared with the neural network system 300. In the SMT-based system, a Z3 library provided by Microsoft® is used as a SMT solver. FIG. 12 further shows that a SMT-based system performs better in terms of processing time. However, the neural network system 300 has the benefit of being more scalable than the SMT-based system.

Experiment III—Training Time

Figure 13:
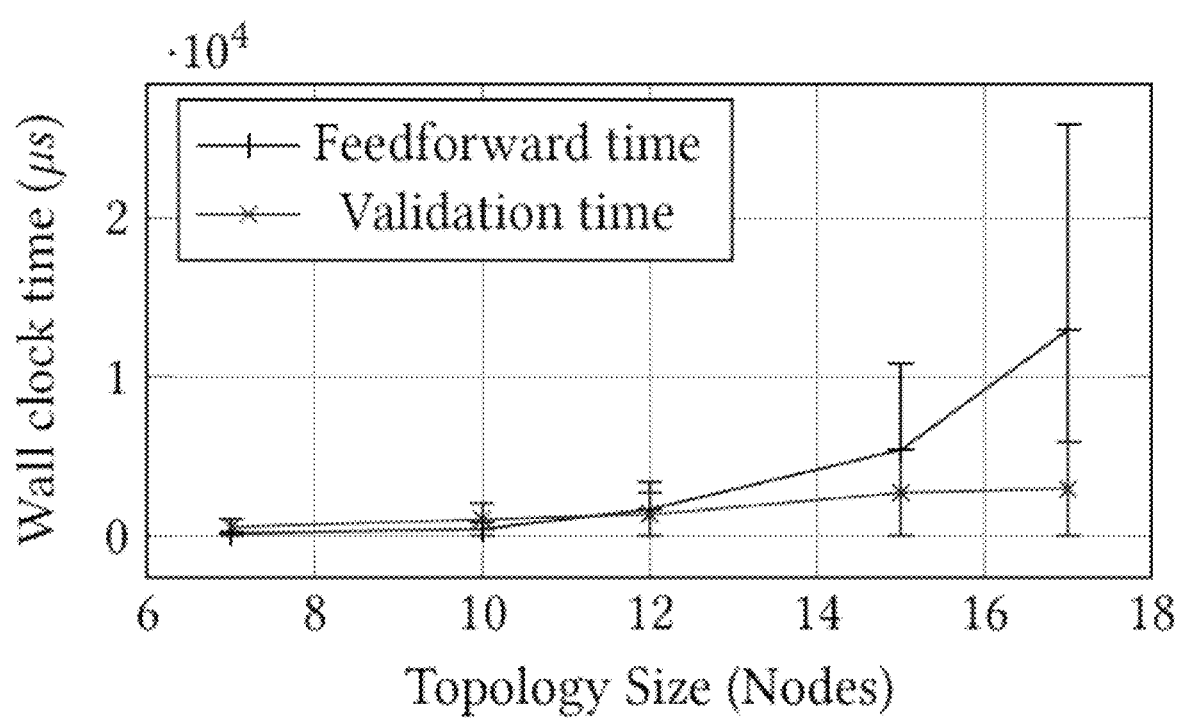
FIG. 13 shows a feedforward time and validation time versus network topology size.

To understand why training time increases exponentially while training episodes increase linearly while using CPU, a third experiment is conducted to test: i) the neural network feedforward time and ii) the validation time. FIG. 13 shows that the neural network feedforward process is the main reason behind the training time exponentially increasing. This problem may be solved by the use of computer hardware specially made to perform the GNN or Readout NN more efficiently, e.g. use of GPUs, which may allow the neural network system 300 to scale linearly with topology size.

Moreover, the neural network system 300 can be adapted, with modification, to generate not only network configurations for other networks such as Multiprotocol Label Switching (MPLS), Access Control List (ACL), and Interior Gateway Protocol (IGP). The only modification required is the configuration validation unit.

Selected definitions of acronyms are shown below:
GNN Graph Neural Network;
GCN Graph Convolutional Neural Network;
LSTM Long Short-Term Memory;
RL Reinforcement Learning;
DRL Deep Reinforcement Learning;
DQN Deep Q-network;
CMA-ES Covariance Matrix Adaptation Evolution Strategy;
SD-WAN Software-Defined WAN;
MED Multi Exit Discriminator;
MSE Mean Squared Error;
SDN Software-Defined Networking;
IoT Internet of Things;
PPO Proximal Policy Optimization;
A2C Advantage-Actor-Critic;
RIP Routing Information Protocol;
TTL Time To Live;
WAN Wide Local Area Network; and
GPU Graphics Processing Unit.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole

The invention claimed is:

1. A system comprising:
a processor; and
a non-transient memory storing instructions which, when executed by the processor, cause the system to:
  receive a first matrix M representative of a network having a plurality of routers, wherein each element $M_{ij}$ in M indicates a connectivity state for data traffic between two routers from the plurality of routers based on a set of network requirements;
  store in the non-transient memory, a graph neural network (GNN) comprising a plurality of nodes v and a plurality of edges, wherein each of the plurality of nodes corresponds to a respective router from the plurality of routers, and each of the plurality of edges corresponds to a physical link connection between two or more of the plurality of routers; and
  train the GNN, based on the first matrix M and a second matrix $X_v$ having a plurality of elements, to generate an output matrix $O_v$, wherein $O_v$ includes a plurality of nodes labelled based on the first matrix M, wherein training the GNN comprises:
    initializing the GNN based on the second matrix $X_v$;
    aggregating neighbourhood information of each node from the plurality of nodes v of the GNN;
    calculating a hidden state of each node from the plurality of nodes v of the GNN based on the respective neighbourhood information; and
    generating the $O_v$ based on the hidden state of each node from the plurality of nodes v of the GNN.

2. The system of claim 1, wherein the second matrix $X_v$ is an identity matrix.

3. The system of claim 2, wherein each column of $X_v$ is a hot vector that represents a respective router from the plurality of routers.

4. The system of claim 3, wherein:

$$O_v = \begin{bmatrix} M \\ V \end{bmatrix},$$

V is an edge state matrix having a plurality of elements, wherein each element of V indicates a transmission state for data traffic originating from each router of the plurality of routers.

5. The system of claim 4, further comprising instructions to cause the processor to train a Readout Neural Network (Readout NN), wherein the Readout NN receives $O_v$ as input and generates the edge state matrix V.

6. The system of claim 5, further comprising instructions to cause the processor to:
receive the edge state matrix V and generate a reward using a configuration validator; and
update one or more weight parameters in the GNN and the Readout NN based on the reward using an optimizer unit.

7. The system of claim 6, wherein the configuration validator is configured to evaluate the edge state matrix V based on the set of network requirements.

8. The system of claim 6, wherein the optimizer unit is configured to update the one or more weight parameters in the GNN and the Readout NN to maximize the reward.

9. The system of claim 8, wherein when the reward from the configuration validator has a value within a predefined threshold, the processor is configured to, based on the instructions stored in the non-transient memory, stop training the GNN and forward the edge state matrix V to a configuration writer.

10. The system of claim 9, wherein the predefined threshold is 1.

11. The system of claim 9, wherein the processor is configured to, based on the instructions stored in the non-transient memory, cause the configuration writer to convert the edge state matrix V into a valid network configuration.

12. The system of claim 11, wherein the processor is configured to, based on the instructions stored in the non-transient memory, deploy the valid network configuration into one or more of the plurality of routers.

13. A processor-implemented method for generating network configurations using a GNN, the method comprising:
receiving a first matrix M representative of a network having a plurality of routers, wherein each element in M indicates a connectivity state for data traffic between two routers from the plurality of routers based on a set of network requirements;
storing a graph neural network (GNN) comprising a plurality of nodes v and a plurality of edges, wherein each of the plurality of nodes v, and corresponds to a respective router from the plurality of routers, and each of the plurality of edges corresponds to a physical link connection between two or more of the plurality of routers; and
training the GNN, based on the first matrix M and a second matrix $X_v$ having a plurality of elements, to generate an output matrix $O_v$, wherein $O_v$ includes a plurality of nodes labelled based on the first matrix M, wherein training the GNN comprises:
initializing the GNN based on the second matrix $X_v$;
aggregating neighbourhood information of each node from the plurality of nodes v of the GNN;

calculating a hidden state of each node from the plurality of nodes v of the GNN based on the respective neighbourhood information; and generating the $O_b$ based on the hidden state of each node from the plurality of nodes v of the GNN.

14. The method of claim 13, wherein the second matrix $X_v$ is an identity matrix, and each column of $X_v$ is a hot vector that represents a respective router from the plurality of routers.

15. The method of claim 14, wherein:

$$O_v = \begin{bmatrix} M \\ V \end{bmatrix},$$

V is an edge state matrix having a plurality of element, wherein each element of V indicates a transmission state for data traffic originating from each router from the plurality of routers, the method, further comprising training a Readout Neural Network (Readout NN), wherein the Readout NN receives $O_v$ as input and generates the edge state matrix V.

16. The method of claim 15, further comprising:

receiving the edge state matrix V;

evaluating the edge state matrix V to generate a reward based on the set of network requirements; and updating one or more weight parameters in the GNN and the Readout NN based on the reward using an optimizer unit.

17. The method of claim 16, comprising:

updating the one or more weight parameters in the GNN and the Readout NN to maximize the reward;

when the reward has a value meeting a predefined threshold, forwarding the edge state matrix V to a configuration writer; and converting the edge state matrix V into a valid network configuration for deploying into one or more of the plurality of routers.

18. A non-transitory processor-readable medium containing instructions which, when executed by a processor of a processing system cause the processing system to:

receive a first matrix M representative of a network having a plurality of routers, wherein each element in M indicates a connectivity state for data traffic between two routers from the plurality of routers based on a set of network requirements;

store in a non-transient memory, a graph neural network (GNN) comprising a plurality of nodes v and a plurality of edges, wherein each of the plurality of nodes v corresponds to a respective router from the plurality of routers, and each of the plurality of edges corresponds to a physical link connection between two or more of the plurality of routers; and train the GNN, based on the first matrix M and a second matrix $X_v$ having a plurality of elements, to generate an output matrix $O_v$, wherein $O_v$ includes a plurality of nodes labelled based on the first matrix M, wherein training the GNN comprises:

initializing the GNN based on the second matrix $X_v$;

aggregating neighbourhood information of each node from the plurality of nodes v of the GNN;

calculating a hidden state of each node from the plurality of nodes v of the GNN based on the respective neighbourhood information; and generating the $O_v$ based on the hidden state of each node from the plurality of nodes v of the GNN.

* * * * *